Patented Dec. 18, 1945

2,391,025

UNITED STATES PATENT OFFICE 2,391,025

PHOTOENGRAVING

Walter S. Marx, Jr., Santa Barbara, Calif., assignor to Printing Arts Research Laboratories, Inc., Santa Barbara, Calif., a corporation of Delaware No Drawing. Application September 11, 1943, Serial No. 502,043

18 Claims. (Cl. 95—5)

This application is a continuation-in-part of my copending applications Serial No. 318,522, filed February 12, 1940, and Serial No. 452,787, filed July 29, 1942.

This invention relates to photoengraving and more particularly to a method of forming highlight negatives for half tone printing plates.

One of the objects of the present invention is to provide a photo-automatic method for producing negatives in which the screen pattern is suppressed or destroyed in the highlights while carefully preserved in the shaded portions of the printing plate.

In accordance with the present invention, I produce upon the work areas of the original, and particularly the shaded portions thereof, a transparent color and I discharge the highlights by a photographic exposure without a screen or with the screen effectually removed while preventing light of said color from acting upon the negative plate.

Owing to this exposure, the highlight portions of the plate are completely exposed so that they are incapable of preserving the screen pattern which they receive during a separate registering exposure with the aid of a screen. This other exposure registers upon the plate the various gradations of the drawing or object being reproduced.

It must be understood that the present invention is not limited to any particular order of the exposures. The screened exposure may be made first or the unscreened exposure may be made first.

While the color on the work areas of the drawing, or other object being reproduced, may be provided in any desired manner, I prefer to incorporate in the pigment from which the drawing is made the colored material or material which may be treated to produce colored material. In the preferred form of the invention I use a color-forming material which is initially colorless so that the artist can make his drawing, be it an ink drawing or a crayon drawing, without his having to consider or discount color which will not appear in the half-tone reproductions.

When proceeding in this manner I prefer to make my screened exposure with the drawing in the condition in which it is received from the artist. Thereafter I treat the drawing so as to produce the color over the work areas and then make the unscreened exposure so as to discharge the screen pattern in the highlights on the plate.

My invention is not intended to be limited to this convenient order of procedure because I can produce the color over the work areas, make the unscreened exposure and thereafter discharge the color and make the screened exposure. Or, I may first produce the color over the work areas and then make the two exposures in either order, using light for the screened exposure of the same color, or containing light of the same color as the color on the drawing. The unscreened exposure is made with light which does not contain light of the same color as the color on the drawing. This may be effected in several ways. Thus, I may use light deficient in the light of the color on the shaded portions of the drawing. Or, what is effectively the same thing, I may use a filter which substantially absorbs light of the color on the drawing.

In accordance with another modification of my invention, I may make the unscreened exposure without color applied to or produced upon the drawing and then apply or produce upon the work areas of the drawing a color to which the negative is substantially insensitive. The unscreened exposure which is then made discharges screen pattern from the highlight of the negative, the screen pattern of the shadings in the work areas being protected by the color.

As will be obvious from the preceding discussion, the order of exposures may be reversed, the first exposure being the unscreened exposure with color on the work areas and the second exposure being the screened exposure with the color discharged.

In accordance with one modification of my invention, I take a drawing or photograph and apply thereto over the work areas or over the shaded portions thereof a transparent color, that is, a color which does not obscure the shading of the subject. I employ a plate or film which is sensitive to the color employed and also to the color complementary thereto. For example, I may take a plate which is sensitive to red and to the complementary color green and I may apply to the shaded portions or all the work area of the drawing, or subject, a red color. I expose the plate to the image of the subject through a screen with light of the color used for tinting up the subject or what amounts to the same thing with a filter of that color in the camera. Then I remove the screen, either by elevating it out of the path of the light or by moving it forwardly sufficiently to render it ineffective with respect to screen action. The plate is again exposed to the subject with the use of light complementary to the tinting color or with a filter of such complementary color in the camera. The order of the exposures may be reversed. In this case the unscreened exposure provides unscreened light over the portions of the plates corresponding to the highlights so that any screen pattern therein is totally destroyed. During the unscreened exposure the work areas of the drawing are prevented from providing effective light on the corresponding portions of the plate so that the screen pattern on these portions of the plate is preserved.

In another modification of my invention I incorporate in the ink or pigment with which the drawing is made a color or a color-forming material which may initially be colorless. In the case of a crayon or pencil drawing, the color or color-forming material may be included in the crayon or pencil. In the case of a crayon or pencil drawing, the shaded portions of the drawing are constituted by a large number of discrete particles. Each of these particles includes the color or the color-forming material. To make this color or color-forming material effective, it must be distributed over the work area of the drawing and particularly over the shaded portions of the drawing. This may be effected by moistening the drawing with a solvent for the color or color-forming material. The most convenient method of thus moistening the drawing is to spray the solvent upon the drawing and particularly on the shaded portions of the work areas. This solvent treatment dissolves color or color-forming material from the discrete particles of the crayon or pencil and distributes the color or color-forming material in areas around these discrete particles. In the case of initially colorless color-forming materials, the solvent employed may include a reagent which cooperates with the color-forming material to produce the desired color over the shaded portions of the work area. Ordinarily the color or color-forming material is present in the solid portions of the drawing, but no light reaches the light-sensitive plate from these solid portions so that emphasis is laid upon the shaded portions of the drawing because these shaded portions have to be reproduced on the plate in the form of dots of graduated size and the principal function of the color or color-forming material is to preserve the screen pattern in the shaded portions of the drawing.

It may here be remarked that in accordance with the standard photoengraving procedure, the plate may be "flashed" so that a small degree of screen pattern is produced in the solid parts of the drawing.

My invention will more readily be understood from the following specific examples:

Example I

I take a drawing or a photograph and apply over the work areas, and particularly over the shaded portions, a red dye such as eosin. I then photograph the drawing with the aid of a screen and with the aid of red light or a red filter. The plate employed must be responsive to red and the complementary color green. The unscreened exposure is made with green light or what amounts to the same thing, with a green filter. In the first mentioned exposure the light from the shaded portions of the drawings produces dots of corresponding gradation upon the plate. The screen pattern received by the highlight portions of the plate is unimportant because during the unscreened exposure the whole areas of the plate corresponding to the highlights are acted upon by the unscreened light from the corresponding portions of the subject. During the unscreened exposure no light is transmitted from the shaded portions of the drawing to the plate. If green light is employed, it is absorbed by the red color on the drawing. If ordinary light is employed, only red light is reflected from the shaded portions of the drawing and this light is absorbed by the green filter. When the plate is subjected to the usual developing and intensification process, the negative presents white or transparent portions corresponding to the solid portions of the drawing with only the screen pattern resulting from the "flashing." The portions of the negative corresponding to the shaded portions of the drawing are developed with screen pattern corresponding to the shadings of the drawing. The portions of the plate corresponding to the highlights are solid black.

It will of course be understood that I may employ other colors for tinting up the drawing. Thus I may use blue dyes which have the advantage that the screened exposure may be made with ordinary light without any filter and the unscreened exposure with complementary light or with a complementary filter. In the case of blue dyes, the unscreened exposure may be made with yellow-orange light or with a yellow-orange filter. Of course, any other color may be employed using light or a filter of a color which prevents the shaded portions of the drawing from transmitting light to the plate during the unscreened exposure.

Among the blue dyes which are particularly suitable for this purpose are Ultramarine Blue H. M., Soluble American Blue, both manufactured by Calco Chemical Company Division of American Cyanamid Co., and a mixture of Indigotine Conc. and Victoria Blue (Pure) B. O. duPont). All of these dyes may be used with common types of sensitive emulsions in the negative element, using ordinary light for the screened exposure. With these dyes, a satisfactory yellow-orange filter is Wratten Filter #21.

The color thus applied to the subject may be bleached or removed in any suitable manner. The Ultramarine Blue may be discharged by a spray of hydrochloric acid or any other strong acid. Soluble American Blue may be discharged by sodium hydroxide spray. The mixture of Indigotin Conc. and Victoria Blue may be discharged with a hypochloride spray containing one per cent available chlorine.

Example II

I include in the ink or other artists' medium a color-changing compound such as phenolphthalein in colorless form. To the artist the ink or medium is substantially similar to the ink or medium with which he is accustomed to work. The black and white drawing is photographed in the usual manner with a screen. Then the drawing is subjected to alkali treatment so as to produce over the work areas the bright red color of alkali phenolphthalein. This is preferably effected by spraying the drawing with a solution comprising:

| | Parts by volume |
|---|---|
| Water | 20 |
| Isopropyl alcohol | 65 |
| Chemically pure glycerine | 10 |
| Morpholine | 5 |

This solution is preferred because the alkaline material volatilizes off, leaving the work areas in bright red condition. However, practically any other suitable alkali may be employed. The negative is again exposed in the absence of a screen. A plate may be employed which is insensitive to red or light deficient in red or preferably light of complementary color may be employed. As indicated, this result may be attained by the employment of a suitable source of light or by the employment of a suitable filter in the camera.

In the case of a crayon or pencil drawing, the treatment is the same, the colorless phenolphthalein being present in the material of the crayon or pencil. The solution dissolves the phenolphthalein and distributes it over areas contiguous to the discrete particles which form the shading so that the work areas are effectively masked during the unscreened exposure with color which prevents discharge of the screen pattern in the corresponding portions of the plate.

While it is convenient to make the screened exposure first and the unscreened exposure second, the order may be reversed. Thus, the phenolphthalein may be converted into the red form, the unscreened exposure made and then the phenolphthalein may be converted into the colorless form by spraying with dilute acid whereupon the screened exposure may be made. Acetic acid or boric acid may be advantageously employed for discharging the red color of the phenolphthalein.

While I prefer to employ phenolphthalein in this embodiment, it must be understood that I do not intend to be limited thereto. I may employ any other so-called indicator which changes color with its pH condition. Thus I may use 2.5 dinitrophenol, p-nitrophenol or any other known color-changing compound using proper light or filter to prevent discharge of the screen pattern during the unscreened exposure. Moreover, I do not intend to be limited to color-changing materials responsive to pH condition. I may use dichromates in the pigment and spray with diphenylamine or diphenylbenzidine in dilute sulphuric acid and develop a violet color on the drawing or other reacting materials which have products of suitable color.

Example III

I may include in the ink, crayon or pencil with which the drawing is made, litmus in blue or alkaline condition. In the case of a crayon or pencil drawing, the blue color may be distributed over the work areas by spraying with a solvent for the litmus. The screened exposure may now be made with blue or ordinary light. The drawing is then sprayed with an acid such as acetic acid or dilute hydrochloric acid which changes the litmus to a red color. The unscreened exposure is made with the litmus in the red condition with the screen effectually removed. For the unscreened exposure I prevent light from the shaded portions of the drawing from acting upon the plate by any suitable expedient. Thus, I may use a plate insensitive to red, the only color reflected from the shaded portions of the drawing. Or, I may use red light for this exposure, or what amounts to the same thing, I may employ a red filter in the camera.

Here again I do not intend to be limited to this particular color-changing material. I may use tetrabromophenolsulfonphthalein which changes from yellow to blue in the presence of alkalis, or sodium tetrazodiphenyl-naphthionate (Congo Red) which changes from blue to red in the presence of alkali. I may also employ reaction materials which give suitably colored products. Thus I may use bromates on the drawing and spray with methyl orange to discharge the yellow color to a colorless reaction product. Or, I may use ceric sulfate on the work areas of the drawing and spray with xylene cyanol FF. to change the green color of the work areas to orange.

In all the embodiments of my invention I discharge or destroy screen pattern in the highlights by an unscreened exposure, and I register the gradations of the shaded portions by a screened exposure. During the unscreened exposure, said gradations are protected from discharge by substantially preventing light from the shaded portions of the drawing or other subject from registering upon the plate.

I declare that what I claim is:

1. The method of making a half-tone printing plate negative with screen pattern discharged in the highlights while preserved in the shaded portions, which consists in including in the work areas of the subject a color changing compound, subjecting a light sensitive element to two registering exposures of said subject, one of said exposures being made with a screen and with said compound in one condition to register gradations corresponding to shade portions of the subject, the other exposure being made with the screen effectually removed and with the compound in another and colored condition while preventing light of such colored compound from acting on the light sensitive element.

2. The method of making a half-tone printing plate negative with screen pattern discharged in the highlights while preserved in the shaded portions, which consists in including in the work areas of the subject a material having colored and colorless forms, subjecting a light sensitive element to two registering exposures of said subject, one of said exposures being made with a screen and with said material in colorless form, the other exposure being made with the screen effectually removed and with the material in colored condition while preventing light of such colored compound from acting on the light sensitive element.

3. The method of making a half-tone printing plate negative with screen pattern discharged in the highlights while preserved in the shaded portions, which consists in including in the work areas of the subject a material having colored and colorless forms, subjecting a light sensitive element to an exposure of said subject with a screen and with said material in colorless form, treating the subject to convert said material to colored form and after said conversion subjecting said element to a registering exposure with the screen effectually removed while preventing light of said color from acting on the light sensitive element.

4. A method of half-tone photography with the aid of two substances which react to form a colored compound comprising the steps of distributing one of such compounds over the work areas of the subject to be photographed, photographing the subject so prepared on a light-sensitive negative element in a camera through a half-tone screen in accordance with the usual half-tone procedure, treating the subject with the other substance to form the colored compound over said work areas, and photographing the subject so treated upon the same negative element with the half-tone screen removed while preventing action by light of said color upon the light sensitive element, both exposures being effected with registering images on the light sensitive element.

5. The method of half-tone photography which comprises the steps of photographing a subject on a light-sensitive negative element through a half-tone screen, producing upon the work area of said subject a color, effectually removing the screen, and photographing the same subject on the light-sensitive element through a filter-absorbent of said color, the images of both exposures being in positional register on said element.

6. The method of half-tone photography which comprises the steps of distributing on work area of the subject to be photographed a substance having colorless and colored forms, photographing the subject on a light-sensitive negative element through a half-tone screen with the substance in colorless form, converting said substance into its colored form, effectually removing the screen and photographing the subject on the same light sensitive negative element while preventing photographic action by light of said color upon the light-sensitive element, the images of both exposures being in register on said element.

7. The method of half-tone photography which comprises the steps of distributing on work area of the subject to be photographed a substance having colorless and colored forms, photographing the subject on a light sensitive negative element insensitive to light of the color of said colored form through a half-tone screen with the substance in colorless form, converting said substance into its colored form, effectually removing the screen and photographing the subject on the same light-sensitive negative element, the images on said element being in positional register in both exposures.

8. The method of half-tone photography which comprises the steps of distributing on work area of the subject to be photographed a substance having colorless and colored forms, photographing the subject on a light-sensitive negative element through a half-tone screen with the substance in colorless form, converting said substance into its colored form, effectually removing the screen and photographing the subject on the same light-sensitive negative element through a filter absorbent of said color, the images being in positional register in both exposures.

9. The method of half-tone photography which comprises the steps of making a drawing with pigment material including a color-changing compound, photographing said drawing through a screen onto a light-sensitive element, changing said color and photographing said drawing without a screen on the same element while preventing light of the new color from acting upon the element, the images being in register in both exposures.

10. The method of half-tone photography which comprises the steps of making a drawing with a crayon, including a color-changing compound, photographing said drawing through a screen onto a light-sensitive element, dispersing said compound upon areas around small crayon spots on the drawing, changing said color and photographing said drawing without a screen on the same element while preventing light of the new color from acting upon the element, the images being in register in both exposures.

11. A method of half-tone photography which comprises the steps of distributing over work areas of the subject to be photographed an indicator stain which in neutral condition is colorless, photographing the subject so prepared on a light-sensitive negative element in a camera through a half-tone screen in accordance with the usual half-tone procedure, treating the subject with an alkaline compound to bring out the color of the indicator stain in the work areas thereof, again photographing the subject so treated upon the same negative element and in positional register with the first record and with the half-tone screen effectually removed from the system, and preventing photographic action by light of said color upon the light-sensitive element.

12. A method of half-tone photography which comprises the steps of distributing over the work areas of the subject to be photographed an indicator which in neutral condition is colorless, photographing the subject so prepared on a light-sensitive negative element in a camera through a half-tone screen in accordance with the usual half-tone procedure, treating the subject with an alkaline compound to bring out the color of the indicator stain in the work areas thereof, effectually removing the half-tone screen from the system, interposing a color filter in the optical path between the illuminant and the negative element, which filter is absorbent of the color of the indicator dye, and then again photographing the subject upon the said negative element and in positional register with the first record thereon.

13. A method of half-tone photography for eliminating screen pattern in the highlight portions of a half-tone negative comprising the steps of making a drawing to be photographed with a marking device, the marking material of which includes an indicator in colorless condition, photographing the drawing so prepared on a light-sensitive element in a camera through a half-tone screen in the usual way, spraying the drawing with a compound to change the color of said indicator in the work areas thereof, and again photographing the drawing so treated upon the same negative element and in positional register with the first record thereon and with the half-tone screen effectually removed from the system, while preventing photographic action by light of said color upon the light sensitive element.

14. A method of half-tone photography for eliminating screen pattern in the highlight portions of a half-tone negative comprising the steps of including in work areas of the subject to be photographed phenolphthalein, photographing the subject so prepared on a light-sensitive negative element which is insensitive to red light in a camera through a half-tone screen in the usual way, treating the subject with a chemically basic compound to convert those areas of the drawing to which the phenolphthalein has been applied to a red color, and then again photographing the drawing so modified upon the same negative element and in positional register with the first record thereon and with the half-tone screen effectually removed from the system.

15. A method of half-tone photography for eliminating screen pattern in the highlight portions of a half-tone negative comprising the steps of making a drawing with a marking device, the marking material of which includes phenolphthalein, photographing the drawing so prepared on a light-sensitive negative element which is insensitive to red light in a camera through a half-tone screen in the usual way, treating the drawing with an alkaline compound to convert those areas of the drawing to which the phenolphthalein has been applied to a red color, and then again photographing the drawing so modified upon the same negative element and in positional register with the first record thereon and with the half-tone screen effectually removed from the system.

16. A method of half-tone photography for eliminating screen pattern in the highlight portions of a half-tone negative comprising the steps of including in work areas of the subject to be photographed phenolphthalein, photographing the subject so prepared on a light-sensitive element which is insensitive to red light in a camera through a half-tone screen in the usual way, treating the subject with an alcohol and morpholine solution to convert those areas of the drawing to which the phenolphthalein has been applied to a red color, and then again photographing the drawing so modified upon the same negative element and in positional register with the first record thereon and with the half-tone screen effectually removed from the system.

17. A method of half-tone photography for eliminating screen pattern in the highlight portions of a half-tone negative comprising the steps of making a drawing with a marking device, the marking material of which includes phenolphthalein, photographing the drawing so prepared on a light-sensitive negative element which is insensitive to red light in a camera through a half-tone screen in the usual way, treating the drawing with an alcohol and morpholine solution to convert those areas of the drawing to which the phenolphthalein has been applied to a red color, and then again photographing the drawing so modified upon the same negative element and in positional register with the first record thereon and with the half-tone screen effectually removed from the system.

18. A method of half-tone photography which comprises the steps of including in the work areas of the subject to be photographed an indicator which in neutral condition is colorless, photographing the subject so prepared on a light-sensitive element in a camera through a half-tone screen in accordance with the usual procedure, treating the said work areas of the subject with a compound which spreads the indicator over areas immediately surrounding said work areas and to chemically change the color of the indicator in said work and extended areas, again photographing the subject so treated upon the same negative element and in positional register with the first record and with the half-tone screen effectually removed from the system, and preventing photographic action by the light of the modified color upon the light-sensitive element.

WALTER S. MARX, Jr.